United States Patent [19]
Calligaris

[11] 4,328,449
[45] May 4, 1982

[54] DEVICE FOR CONTROLLING THE SPEED OF MOVEMENT OF A MOBILE MEMBER

[75] Inventor: Mario Calligaris, Turin, Italy

[73] Assignee: Fratelli Sandretto S.p.A., Turin, Italy

[21] Appl. No.: 103,283

[22] Filed: Dec. 13, 1979

[30] Foreign Application Priority Data

Dec. 20, 1978 [IT] Italy .................... 69901 A/78

[51] Int. Cl.³ .............................................. G05B 1/06
[52] U.S. Cl. .................................. 318/571; 318/653; 318/657; 91/361
[58] Field of Search ................. 318/653, 657, 571, 39, 318/616, 618; 91/361

[56] References Cited

U.S. PATENT DOCUMENTS

| | | | |
|---|---|---|---|
| 3,512,060 | 5/1970 | Floyd | 318/616 X |
| 3,517,283 | 6/1970 | McCullough | 318/653 X |
| 3,539,897 | 11/1970 | Sommeria | 318/618 |
| 3,828,439 | 8/1974 | Ishikawa et al. | 318/657 X |
| 4,136,302 | 1/1979 | Tlaker et al. | 318/571 X |

*Primary Examiner*—B. Dobeck
*Attorney, Agent, or Firm*—Frost & Jacobs

[57] ABSTRACT

A device for controlling the speed of movement of a mobile member relative to a fixed support member, said mobile member receiving its motion from first drive means is described. The main feature of said drive is that it comprises a speed transducer operated directly by said mobile member and arranged to supply an electrical signal proportional to said speed of movement of said mobile member to second comparison and processing means, to said second means there being also fed at least one electrical reference signal proportional to a predetermined value of said speed; the output signal of said second means, proportional to the difference between said signal of said transducer and said electrical reference signal, being fed to said first drive means.

4 Claims, 2 Drawing Figures

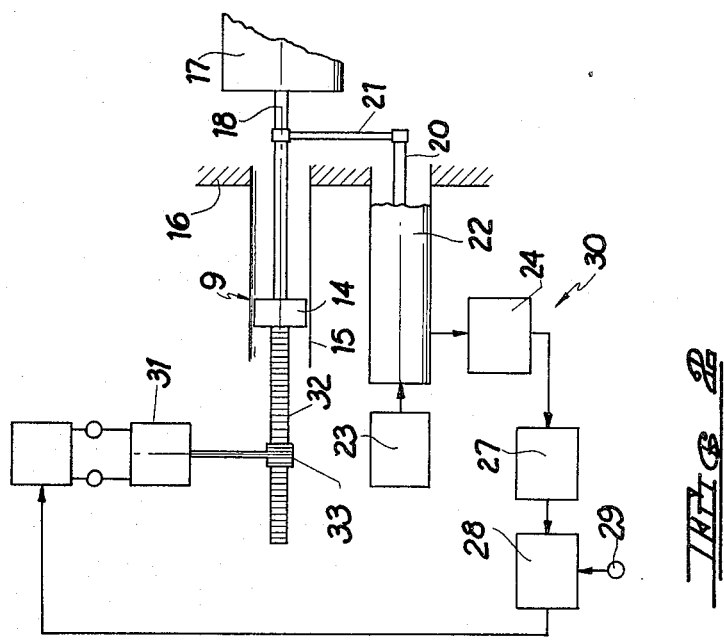

DEVICE FOR CONTROLLING THE SPEED OF MOVEMENT OF A MOBILE MEMBER

BACKGROUND OF THE INVENTION

This invention relates to a device for controlling the speed of movement of a mobile member.

In particular, this invention relates to a device arranged to control the speed of movement of a mobile carriage of a plastics moulding machine, of a machine tool or of a hydraulic press etc., relative to a fixed machine support member.

In the machine tool field in general, and in moulding machines in particular it is often necessary both to know the position of a particular mobile carriage at any moment in a processing cycle, and to control the carriage speed.

If the carriage is driven by a hydraulic system, such machines are provided with a pressurised fluid source which feeds the fluid through a conduit to a carriage drive member. At present, the speed of this latter is controlled indirectly by controlling the flow rate of the fluid fed to the drive member by means of flow regulators mounted in series along said conduit.

A first type of regulator device is known comprising constrictions through which the pressurised fluid passes. The opening in these constrictions is adjustable in such a manner as to obtain a fluid flow rate which gives a corresponding required carriage movement speed. However, such constrictions give rise to a pressure drop along the conduit, such that it is necessary to have a source pressure upstream of the regulator which is considerably higher than that required on average by the drive member. As the fluid quantity not fed to the drive member is bled off through a valve at this pressure, there is consequently a considerable wastage in power associated with the fluid bled off, and there is also a substantial pressure drop along the conduit at said constrictions. Furthermore, if a resisting force exceeding a limiting value opposes the carriage during a processing cycle, the pressure downstream of the regulator can be insufficient, and therefore give rise to undesirable slowing down of the carriage.

A second known type of flow regulator, designed to obviate the drawbacks of the said first type, comprises substantially a flow transducer mounted in said conduit, to provide at its output an electrical signal proportional to the flow rate in the conduit, and further comprising a valve disposed upstream of the flow transducer and arranged to bleed off a variable quantity of the pressurised fluid supplied by the feed source. The electrical signal supplied by the transducer is compared with an electrical reference signal, and the resultant electrical signal is used to control the bleed valve in such a manner as to maintain the fluid flow rate constant, and thus the carriage speed constant as the resistant force opposing the carriage varies. However, this second type of regulator device has a drawback due to its poor response time. In this respect, as the flow transducer is generally mechanical, it has an inherent inertia which introduces excessively high response times. Consequently, the pressure adjustment resulting from a sudden resistant force opposing the carriage is slow, and there is a consequent fall in the instantaneous speed. Moreover, as the available regulators always have mechanical moving parts, these latter wear with time, and this gives rise to fluid leakages, because of which after an initial period of activity, continuous maintenance is required.

Finally, the flow regulators available commercially are of rather high cost, which when associated with the cost of the frequent maintenance makes the use of such regulators particularly expensive.

SUMMARY OF THE INVENTION

The object of the present invention is to provide a device for controlling the speed of movement of a mobile member, which is substantially free from the aforesaid drawbacks of known available devices.

The present invention provides a device for controlling the speed of movement of a mobile member relative to a fixed support member, said mobile member receiving its motion from first drive means, comprising a speed transducer operated directly by said mobile member and arranged to supply an electrical signal proportional to said speed of movement of said mobile member to second comparison and processing means, to said second means there being also fed at least one electrical reference signal proportional to a predetermined value of said speed; the output signal of said second means, proportional to the difference between said signal of said transducer and said electrical reference signal, being fed to said first drive means in order to maintain said speed of movement of said mobile member substantially equal to said predetermined value of said speed.

BRIEF DESCRIPTION OF THE DRAWING

FIG. 2 is a similar block diagram illustrating the use of an electric motor.

DETAILED DESCRIPTION OF THE INVENTION

Figure 1:
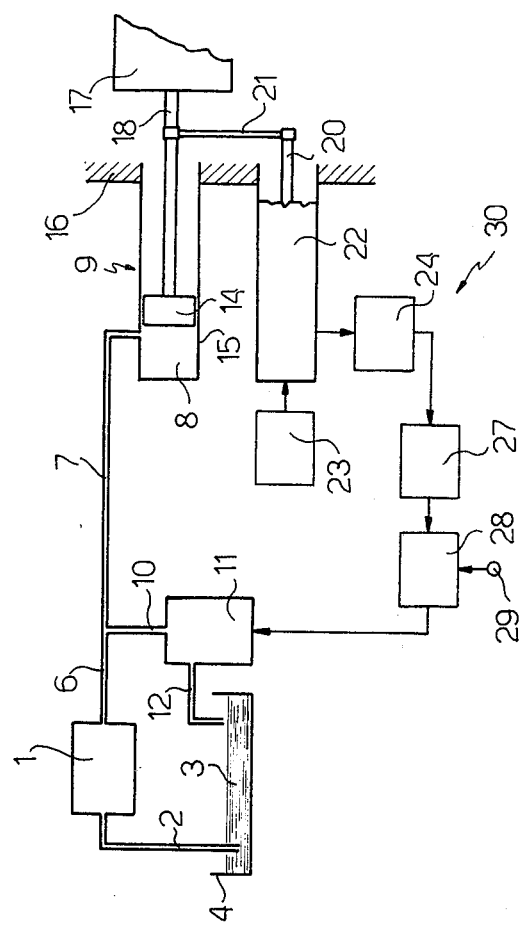
FIG. 1 is a block diagram illustrating the preferred embodiment of the invention utilizing a fluid motor.

With reference to said drawing, the reference numeral 1 indicates a pressure source of constant flow rate, for example a pump, comprising a conduit 2 for drawing in a fluid 3 contained in a collection tank 4. The pump 1 is also provided with an outlet conduit 6 which is subdivided into a feed conduit 7 for a chamber 8 of a user item 9, and a conduit 10 connected to a bleed valve 11, the output conduit 12 of which flows back into the tank 4. The user item 9 comprises a piston slidable axially in a cylinder 15, the inner facing surfaces of which peripherally define the chamber 8. The cylinder 15 is rigidly connected to a fixed support member 16, and the piston 14 is arranged to transmit axial translatory motion to a mobile member 17 by way of a rod 18.

The mobile member 17 and support member 16 are constituted respectively, for example, by a mobile carriage of a plastics moulding machine and a support member of the machine.

A ferromagnetic core 20 is rigidly connected to the rod 18 by a transverse arm 21. The core 20 forms part of a transformer indicated overall by 22 and comprising substantially a primary winding and a secondary winding wound coaxially the one on the other in the form of a coil, so as to comprise internally a duct able to receive said core 20. The primary winding of the transformer 22 is supplied by an oscillator 23, and the secondary winding of said transformer 22 feeds to a rectifier and amplifier circuit 24 an electrical signal proportional to the portion of the core 20 which is inside said duct.

The structure of the transformer 22 and its operation are described in detail in patent application No. 69893-

A/78 filed by the same applicant on Dec. 19, 1978, and entitled "Apparatus for determining the position of a mobile member relative to a fixed support member".

The rectifier and amplifier circuit 24 therefore provides at its output a continuous electrical signal, the amplitude of which depends on the amount of the core 20 inserted into the transformer 22, i.e. on the position of the mobile member 17 relative to the fixed support member 16. The output signal of the circuit 24 is fed to the input of a derivation circuit 27, the output of which is connected to a first input of a comparison and amplification block 28. As the input signal of the derivation circuit 27 is proportional to the instantaneous value of the displacement of the mobile member 17 relative to the member 16, the signal fed to the first input of the block 28 is proportional to the instantaneous value of the speed of movement of the member 17 relative to the member 16.

The second input of the block 28 is connected to a terminal 29, to which a plurality of continuous electrical signals can be fed from the outside, in a manner not illustrated, in accordance with a predetermined cycle. Finally, the output of the block 28 at which an electrical signal is present proportional to the difference between the signals fed to the first and second input is connected to the activation and control input of the bleed valve 11.

The transformer 22, oscillator 23, rectifier and amplifier circuit 27, comparison block 28 and bleed valve 11 constitute overall a device 30 for controlling the speed of movement of the member 17 relative to the support member 16.

The operation of the device 30 is as follows.

It will be assumed that the mobile member 17 is to move at a predetermined speed relative to the support member 16. For this purpose a suitable direct current voltage is made available at the terminal 29, and reaches the second input of the comparison block 28. Until the pressure source 1 is made to feed pressurised fluid 3 into the conduit 6, the piston 14 does not move. Consequently, at the output of the transformer 22 there is a voltage signal present which is constant and proportional to the position of the core 20 inside it. This constant signal also determines at the output of the derivation circuit 27 a zero signal which reaches the first input of the comparison block 28. Consequently this latter feeds no electrical signal to the activation input of the bleed valve 11, which thus remains closed.

When the pressure source 1 is activated, the fluid 3 is drawn from the collection tank 4 and is fed under pressure into the chamber 8 through the outlet conduit 6 and the feed conduit 7. This pressurised fluid transmits an axial thrust on the base surface of the piston 14, which moves and transmits motion to the mobile member 17 and core 20. In the transformer 22 there is consequently a variation in the coupling coefficient between the primary and secondary windings, which causes the output signal to vary. This latter signal is amplified through the rectifier and amplifier circuit 27, at the output of which there is therefore a direct current voltage signal which increases proportionally to the speed of movement of the piston 14 or mobile member 17 relative to the support member 16.

Until the signal present at the first input of the block 28 reaches the value of the signal imposed at the second input of the block 28, the output of this block keeps the bleed valve 11 unactivated, and therefore the supply source 1 continues to feed the fluid 3 at full flow rate into the chamber 8. The piston 14 is therefore subject to accelerated motion until it reaches the predetermined speed.

The mobile member 17 reaches the predetermined speed substantially when the output signal of the derivation circuit 27 reaches a voltage equal to that set at the terminal 29. Under these conditions, the block 28 activates the bleed valve 11, which reduces the amount of pressurised fluid fed by the source 1 into the outlet conduit 6, by bleeding a part of the fluid into the tank 4 through the conduits 10 and 12.

There is therefore feedback control which enables the mobile member 17 to move at a predetermined speed relative to the fixed support member 16.

From an examination of the characteristics of the present invention, it is apparent that the device 30 attains the set objects.

In this respect, the control device 30 directly determines the speed of the mobile member 17 and then controls its value by acting on the flow rate of the fluid 3 fed into the feed conduit 7. This therefore obviates all the drawbacks of the indirect control devices which were disposed between the feed source and user item, and which required constrictions along the feed conduit with consequent pressure drops and the need to have available a pressurised feed source of very high pressure.

Moreover, as the only mobile part of the device 30 is the ferromagnetic core 20, the device 30 has a very low response time, as no lag is introduced due to mechanical inertia phenomena.

Finally, the cost of the device 30 can be very low overall, as components are used which are usable also for other purposes, for example for determining the instantaneous position of the mobile member 17 (transformer 22, oscillator 23, rectifier and amplifier circuit 24). In addition, as no member is subject to wear, it can be presumed that the frequency of maintenance can be greatly reduced.

Finally, it is apparent that modifications can be made to the embodiment of the present invention without leaving the scope of the inventive idea.

For example, the piston 14 of the user item 9 could be driven by an electric motor 31 operatively connected to rod 18, as by means of a conventional rack 32 and pinion 33, in which case the output of the block 28 supplies a signal for controlling the speed of electric motor 31.

Again, if the mobile member 17 is required to assume a plurality of speeds of movement according to the position assumed by the member 17 relative to the fixed support member 16 during a single processing cycle, a plurality of inputs could be provided instead of the second input of the block 28, each fed by a signal with a predetermined voltage corresponding to a predetermined speed. Each input could then be made to transmit its signal to the block 28 by a control signal taken from the output of the amplifier circuit 24, this latter signal depending directly on the instantaneous position assumed by the mobile member 17 relative to the fixed support member 16.

What we claim is:

1. A device for controlling the speed of movement of a mobile member relative to a fixed support, comprising a drive means for moving said mobile member, said drive means comprising a constant flow rate feed source arranged to feed a pressurized fluid to a motion transmission member operatively connected to said mobile member, and at least one bleed valve arranged to bleed off a variable quantity of the pressurized fluid being fed to the motion transmission member, a speed transducer connected directly to said movable member and arranged to supply an electrical signal proportional to the speed of movement of said mobile member, comparison and processing means for receiving the electrical signal from said speed transducer, means for supplying to said comparison and processing means at least one electrical reference signal proportional to a predetermined value of the speed of said mobile member, said comparison and processing means generating an output signal proportional to the differences between the signal generated by said speed transducer and said reference signal, said output signal being fed to said bleed valve to vary the movement thereof, whereby the speed of movement of said mobile member is maintained substantially equal to the predetermined value of said speed.

2. A device as claimed in claim 1, wherein said speed transducer comprises a position transducer able to generate an electrical output signal proportional to the position assumed by said mobile member relative to said fixed support member, and a derivation circuit disposed in series with said position transducer; said electrical signal proportional to said speed of movement being obtainable at the output of said derivation circuit.

3. A device as claimed in claim 2, wherein a plurality of electrical reference signals are fed to said comparison and processing means, each of said signals being arranged to be transmitted to said comparison and processing means when said mobile member assumes a predetermined position relative to said fixed support member.

4. A device as claimed in claim 3, wherein each electrical signal of said plurality of electrical signals is arranged to be transmitted to said comparison and processing means by said electrical output signal provided by said position transducer.

* * * * *